United States Patent [19]

Hambrick, Sr. et al.

[11] 4,202,425
[45] May 13, 1980

[54] ACOUSTIC IMPULSE GENERATOR

[76] Inventors: William H. Hambrick, Sr., P.O. Box 1628, Conroe, Tex. 77301; Charles L. Raybon, 5836 W. Flower St., Phoenix, Ariz. 85033

[21] Appl. No.: 886,440

[22] Filed: Mar. 14, 1978

[51] Int. Cl.² .............................................. G01V 1/38
[52] U.S. Cl. ..................................... 181/120; 181/118
[58] Field of Search ................ 181/118, 120, 110, 119

[56] References Cited

U.S. PATENT DOCUMENTS

| | | | |
|---|---|---|---|
| 3,058,540 | 10/1962 | Simpson | 181/118 |
| 3,349,867 | 10/1967 | Mounce | 181/119 |
| 3,433,202 | 3/1969 | Sharp et al. | 181/120 |
| 3,482,646 | 12/1969 | Brown et al. | 181/120 |
| 3,895,687 | 7/1975 | McLaughlin, Jr. et al. | 181/120 |
| 4,095,667 | 6/1978 | Mahig et al. | 181/120 |
| 4,108,271 | 8/1978 | Chelminski | 181/120 |
| 4,131,178 | 12/1978 | Bouyoucos | 181/120 |

*Primary Examiner*—Howard A. Birmiel
*Attorney, Agent, or Firm*—Bernard A. Reiter

[57] ABSTRACT

An acoustic impulse generator is disclosed for use in a fluid media for oceanographic, seismographic and related applications. The generator includes a housing with a piston slidably disposed therein and a passageway through which a rod attached to the piston moves. A firing chamber is attached to the housing for channeling a quantity of liquid through a nozzle. A diaphragm may be disposed between the housing and the firing chamber with the quantity of liquid being displaced in response to movement of the piston.

14 Claims, 1 Drawing Figure

ACOUSTIC IMPULSE GENERATOR

BACKGROUND OF THE INVENTION

In oceanographic, seismographic and related studies, it is well known that vessels are used to move across the surface of the water discharging acoustic impulses. These impulses are then received by related instruments to provide data for the studies. The devices used to discharge the acoustic impulses are commonly called acoustic impulse generators and provide acoustic energy in and through sea water and other fluid media.

Typically, these generators are immersed in the fluid media and have a movable striker for impacting against a surface of the generator. Although many fluids are used to move the striker, commonly, a gas charge is provided to one side of the striker for moving it against the surface. Because the generator is immersed, it has been very difficult to prevent damage to the striker from the liquid media. Moreover, the intensity of the acoustic signal generated depends on the pressure of the gas charge. Thus, multiple large compressors are supported by the vessels to provide these high gas pressures, such as 2000 psi. Because there are multiple compressors used and they are large, substantial valuable space is used in the vessels for the compressors.

Accordingly, it is a primary object of the present invention to provide an acoustic impulse generator which may be immersed in a liquid media without harmful damage to movable components therein.

A further object of the present invention is to provide an acoustic impulse generator that generates acoustic impulses in a fluid media using a relatively low gas pressure.

A further object of the present invention is to provide an acoustic impulse generator that needs less space in vessels for compressors than prior art generators.

A further object of the present invention is to provide an acoustic impulse generator that uses a diaphragm covering a passageway in a housing to prevent the passage of liquid from the fluid media into the housing.

A further object of the present invention is to provide an acoustic impulse generator which has a diaphragm constructed so that no stresses develop in the diaphragm when the diaphragm is moved.

A further object of the present invention is to provide an acoustic impulse generator having a firing chamber attached to a housing for channeling a quantity of liquid through a nozzle, the nozzle being constructed to generate the acoustic impulse into liquid outside of the firing chamber.

In accordance with the invention, an acoustic impulse generator used in a liquid media, such as sea water, is disclosed. The generator includes a housing forming a gas chamber having an inlet end with a passage communicating with the gas chamber for receiving a charge of gas, an outlet end with a passage communicating with the gas chamber for exhausting gas from the gas chamber and a passageway in the outlet end. A piston is slidably disposed within the gas chamber and has a head for receiving the charge of gas and a rod attached to the head for moving through the passageway. A firing chamber is attached to the housing for channeling a quantity of liquid through a nozzle into liquid located outside the firing chamber and is constructed to generate the acoustic impulse into the outside liquid. A diaphragm is disposed between the housing and the firing chamber covering the passageway to prevent the passage of liquid through the passageway from the firing chamber to the gas chamber and a quantity of liquid is displaced from the firing chamber in response to movement of the piston and diaphragm.

DESCRIPTION OF THE DRAWINGS

Other objects and advantages of the invention will become apparent upon reading the following detailed description and upon reference to the drawings, in which like reference characters are used throughout to designate like parts.

Figure 1:
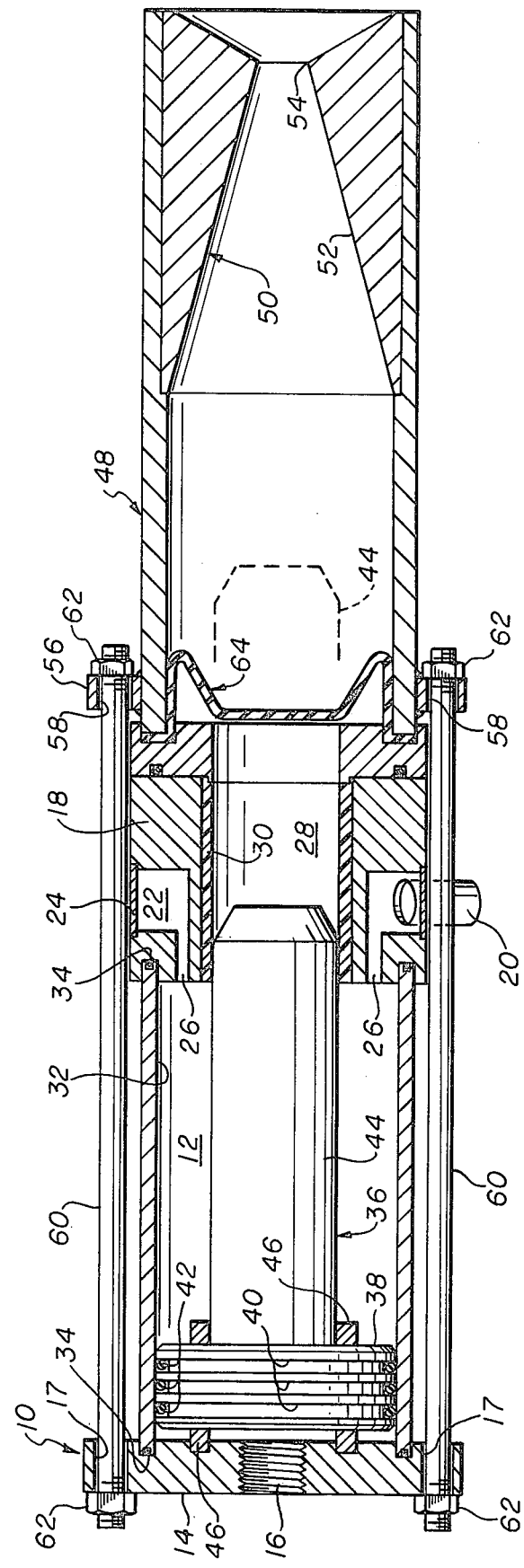
FIG. 1 is a plan view, partly in section, of an acoustic impulse generator constructed according to the present invention.

While the invention will be described in connection with a preferred embodiment, it will be understood that this is not intended to limit the invention to that embodiment. On the contrary, it is intended to cover all alternatives, modifications and equivalents as may be included within the spirit and scope of the invention as defined by the appended claims.

DESCRIPTION OF THE INVENTION

Turning now to the drawing, an acoustic impulse generator constructed according to the present invention is shown. A housing 10 is used in the generator to form a gas chamber 12. Housing 10 has an inlet end 14 with a threaded passage 16 for receiving piping therein to place chamber 12 in communication with a gas source (not shown), such as an air compressor, and a plurality of bolt holes 17 disposed about the periphery of end 14. An outlet end 18 with a passage 20 communicating with gas chamber 12 is provided in housing 10 to permit the passage of exhaust gas from chamber 12. Preferably, passage 20 includes a manifold chamber 22 cut into the exterior of outlet end 18 and covered by a tabular plate 24 attached to the exterior and a plurality of ports 26 extending from chamber 22 to gas chamber 12. Outlet end 18 forms a passageway 28, which is preferably lined with a rod guide sleeve 30. Sleeve 30 is made from a material having a low coefficient of friction, such as certain acetal resins and fluorocarbon polymers. A wall 32, preferably cylindrical, extends from a groove cut in inlet end 14 to a groove cut in outlet end 18 to thereby enclose gas chamber 12 and prevent the passage of liquid into gas chamber 12 when the generator is immersed. O-rings 34 may be inset at each end of wall 32 to provide improved sealing engagement in the grooves in ends 14 and 18.

A piston 36 is slidably disposed within gas chamber 12 and has a head 38 for receiving the charge of gas. Preferably, a plurality of slots 40 are disposed annually about the outer periphery of head 38 with an O-ring 42 provided in each slot 40 to prevent the passage of gas around head 38. A rod 44 is attached to head 38 and moves within passageway 28 provided in an outlet end 18. Thus, rod 44 is moved through passageway 28 to the position shown in dotted outline in response to a charge of gas received by head 38 through passage 16 and may be returned to the position shown in solid outline in response to gas expulsion through passage 20. Disposed on each side of side 38 are bumpers 46, which inhibit shock to head 38 should piston 36 hit either end 14 or 18.

A firing chamber 48 is attached to housing 10 for channeling a quantity of liquid through a nozzle 50. Firing chamber 48 is constructed to generate the acoustic impulse into liquid outside of nozzle 50. Preferably, nozzle 50 is disposed within firing chamber 48 and formed by an inside wall 52 generally converging to form an orifice 54. A flange 56 having bolt holes 58 is provided on the outer surface of firing chamber 48 and bolts 60 extend through holes 17 and 58 for joining by nuts 62 to connect body 10 to firing chamber 48.

A diaphragm 64 is disposed between housing 10 and firing chamber 48 for covering passageway 28. Diaphragm 64 is used to prevent the passage of liquid from firing chamber 48 into gas chamber 12 via passageway 28. Thus, piston 36 is isolated from contact with liquid which aids in the maintenance of the generator. Preferably, diaphragm 54 is folded within firing chamber 48 with an annular reverse accordian fold to permit instantaneous inversion thereof facile movement of the diaphragm with the rod 44 without developing stresses therein. The annular reverse fold is in adjacent to and/or substantially contacting relation with the firing chamber means so that the fold may act as a hinge for the diaphragm means to reduce the tension forces applied thereto during impulse generation and further enhance the life of diaphragm operation.

In operation, a charge of gas enters gas chamber 12 through passage 16 to strike head 38 of piston 36. Rod 44 thereupon slides through passageway 28 against diaphragm 64. A quantity of liquid is displaced by rod 44 and diaphragm 64 moving into firing chamber 48, the quantity of liquid being channelled by firing chamber 48 through nozzle 50 with the acoustic impulse thus being generated in the liquid outside firing chamber 48.

From the foregoing, it will be seen that this invention is one well adapted to attain all the ends and objects hereinabove set forth, together with other advantages which are obvious and which are inherent in the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanied drawing is to be interpreted as illustrative and not in a limiting sense.

That which is claimed and desired to be secured by U.S. Letters Patent is:

1. An acoustic impulse generator comprising a housing forming a gas chamber having an inlet end with a passage communicating with the gas chamber for receiving a charge of gas and an outlet end with a passage communicating with the gas chamber for exhausting gas therefrom,
   a passageway in said generator,
   a piston means slidably disposed for reciprocal movement within said passageway,
   a firing chamber attached to said gas chamber adjacent the exit of said passageway thereof and being characterized by an outlet orifice in communication with a liquid environment, and,
   a diaphragm means affixed to said generator proximate said passageway so that said piston means travels through said passageway into direct contact with the said diaphragm means and thereafter into said firing chamber thereby expelling liquid through the orifice and producing an acoustic impulse.

2. The generator of claim 1, wherein said diaphragm is folded within said firing chamber with an accordian fold to permit movement of the diaphragm without developing stresses therein.

3. An acoustic impulse generator comprising a housing forming a gas chamber having an inlet end with a passage communicating with the gas chamber for receiving a charge of gas, an outlet end with a passage communicating with the gas chamber for exhausting gas from the gas chamber, and a passageway in the outlet end, a piston slidably disposed within the gas chamber movable through the passageway, a firing chamber having the interior thereof exposed to a liquid environment attached to said housing adjacent the outlet end and a diaphragm disposed between said housing and said firing chamber for receiving the piston in direct contacting relation upon firing of the generator to thereby propel the diaphragm into the firing chamber so as to produce instant expulsion of liquid therefrom and a concomitant acoustic impulse.

4. The generator of claim 3, wherein said diaphragm is folded within said firing chamber with an accordian fold to permit movement of the diaphragm while minimizing stresses therein.

5. The generator of claim 3, wherein the passageway in said housing is lined with a rod guide sleeve made from a material having a low coefficient friction to permit the rod to move relatively friction-free through the passageway.

6. An acoustic impulse generator adapted for underwater use comprising a housing with a piston means slidably disposed therein, said housing having a passageway through which the piston means moves, a firing chamber means in communication with the water attached to said housing adjacent the passageway a nozzle means formed in said firing chamber means generally converging to form an orifice, and an elastic diaphragm means disposed between said housing and said firing chamber across the path of travel of the piston means through said passageway for preventing the passage of liquid into said housing and firing means for driving the piston means through the passageway into direct contacting relation with said elastic diaphragm means, said piston means being driven into said firing chamber to thereby expel liquid therefrom and produce an acoustic impulse.

7. The generator of claim 6, wherein said housing forms a gas chamber with the piston slidably disposed therein and the piston has a head for receiving a charge of gas which moves the piston.

8. The generator of claim 6, wherein said diaphragm has an accordian fold within said firing chamber to permit movement of the diaphragm without developing stresses therein.

9. An acoustic impulse generator for producing an identifying impulse signal beneath the surface of a body of water and including a hermetically sealed chamber for generating and containing a gaseous force and a firing chamber means affixed to and in communication therewith and having the interior thereof in fluid communication with the water to be expelled from the generator, the improvement comprising:
   an air inlet means and outlet means in said sealed chamber,
   a piston means in fluid pressure communication with said air inlet means so that upon the introduction of air through said air inlet means said piston means is caused to move toward said firing chamber means, an explansible diaphragm means closing an end of said hermetically sealed chamber and disposed in the path of said piston means for expansive movement into the firing chamber means upon abutting contact by said piston means, ignition means for driving the piston means into direct contact with the diaphragm means and thereafter into the firing chamber, said diaphragm means being adapted to expand into contacting relation with said firing chamber means subsequent to contact by said piston means in order to forcibly expel water from said firing chamber means in order to produce an explosive acoustic impulse.

10. The acoustic impulse generator of claim 9 wherein said firing chamber means includes a plurality of walls therein arranged in converging configuration toward the exit of the water thereof so as to enhance the pressure of water emission from said firing chamber means.

11. The acoustic impulse generator of claim 10 wherein said diaphragm means is characterized by a concave configuration before contact by said piston means and a convex configuration after contact by said piston means, so as to thereby reduce the volumetric area of the firing chamber means by instant inversion of said diaphragm means in order to minimize development of stresses in the diaphragm means and enhance the operational life thereof.

12. The acoustic impulse generator of claim 10 wherein said diaphragm means is characterized by an annular reverse fold adjacent to and in substantially contacting relationship with said firing chamber means, the central portion of said diaphragm means adapted to abuttingly receive said piston means upon movement thereof toward the firing chamber means, said annular reverse fold thus acting as a hinge which provides for increased water expulsion from the firing chamber means by movement of the piston means thereinto while simultaneously reducing the tension force experienced by the diaphragm means and thus enhancing the life of diaphragm operation.

13. An acoustic impulse generator of the type which includes a hermetically sealed chamber means for containing a reciprocally moving piston means therein responsive to fluid pressure thereon and a firing chamber means having a first end adapted to receive thereinto said piston means and a second end in fluid communication with water to be expelled therefrom, the improvement comprising:

an expansible diaphragm means hermetically sealing said first mentioned chamber means from said firing chamber means characterized by first and second surface sides thereof, the first surface side of said diaphragm means enclosing said hermetically sealed chamber and being in direct contact with the piston means upon actuation thereof so as to be driven through said firing chamber means, said second surface side of said diaphragm means being in fluid communication with the water so that driving movement of the diaphragm means by the piston means into the firing chamber means causes instant expulsion of water from the firing chamber means, thus producing an acoustic impulse as a result thereof.

14. The acoustic impulse generator of claim 13 wherein said diaphragm means is constructed to expand into the firing chamber means without subjecting said diaphragm means to tensile forces therein.

* * * * *